(12) United States Patent
Murakoshi

(10) Patent No.: US 7,607,215 B2
(45) Date of Patent: Oct. 27, 2009

(54) METHOD OF MANUFACTURING MAGNETIC HEAD SLIDER

(75) Inventor: Ryuta Murakoshi, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 21 days.

(21) Appl. No.: 11/420,507

(22) Filed: May 26, 2006

(65) Prior Publication Data

US 2006/0265862 A1 Nov. 30, 2006

(30) Foreign Application Priority Data

May 31, 2005 (JP) ............... 2005-159365

(51) Int. Cl.
*G11B 5/127* (2006.01)
*H04R 31/00* (2006.01)

(52) U.S. Cl. .................. 29/603.12; 29/417; 29/603.13; 29/603.15; 29/603.16; 156/268; 156/344; 360/235.7; 360/235.8; 360/236.5; 360/236.6; 360/237; 451/5; 451/41

(58) Field of Classification Search .............. 29/417, 29/603.12–603.16, 603.18; 360/235.7, 235.8, 360/236.3, 236.5, 236.6, 237; 451/5, 41; 156/268, 344

See application file for complete search history.

(56) References Cited

U.S. PATENT DOCUMENTS 6,374,479 B1 * 4/2002 Sasaki et al. ............. 29/603.16
7,265,035 B2 * 9/2007 Honma et al. ............... 438/464
2005/0250193 A1 * 11/2005 Dziedzic et al. ............. 435/174
2006/0157442 A1 7/2006 Ito et al.
2006/0157447 A1 7/2006 Ito et al.

FOREIGN PATENT DOCUMENTS

| JP | 09263973 A | * 10/1997 |
| JP | 11-316928 | 11/1999 |
| JP | 11-328642 | 11/1999 |

OTHER PUBLICATIONS

English Language Abstract of JP 11-316928.
English Language Abstract of JP 11-328642.

* cited by examiner

*Primary Examiner*—Paul D Kim
(74) *Attorney, Agent, or Firm*—Greenblum & Bernstein, P.L.C.

(57) ABSTRACT

To provide a method of manufacturing magnetic head slider which is capable of improving the product quality, simplifying the manufacturing process, and reducing the manufacturing time. This method of manufacturing a magnetic head slider, formed by cutting out from a block member, includes the steps of: processing an end face of the block member forming one surface of a magnetic head slider; holding fixedly the end face of the block member processed; and while maintaining a holding state provided by the step of holding, cutting a portion of the end face side of the block member, and processing a cut surface of the cut portion forming another surface of the magnetic head slider.

9 Claims, 11 Drawing Sheets

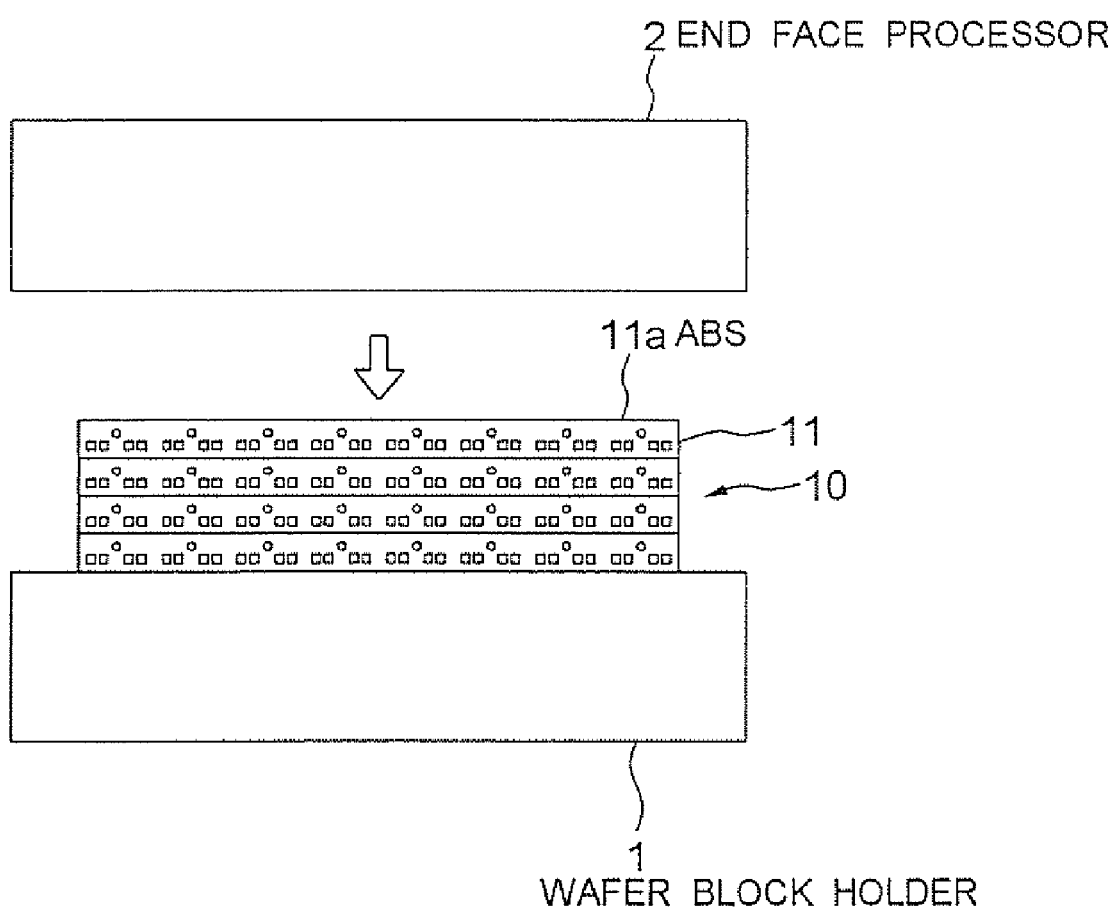

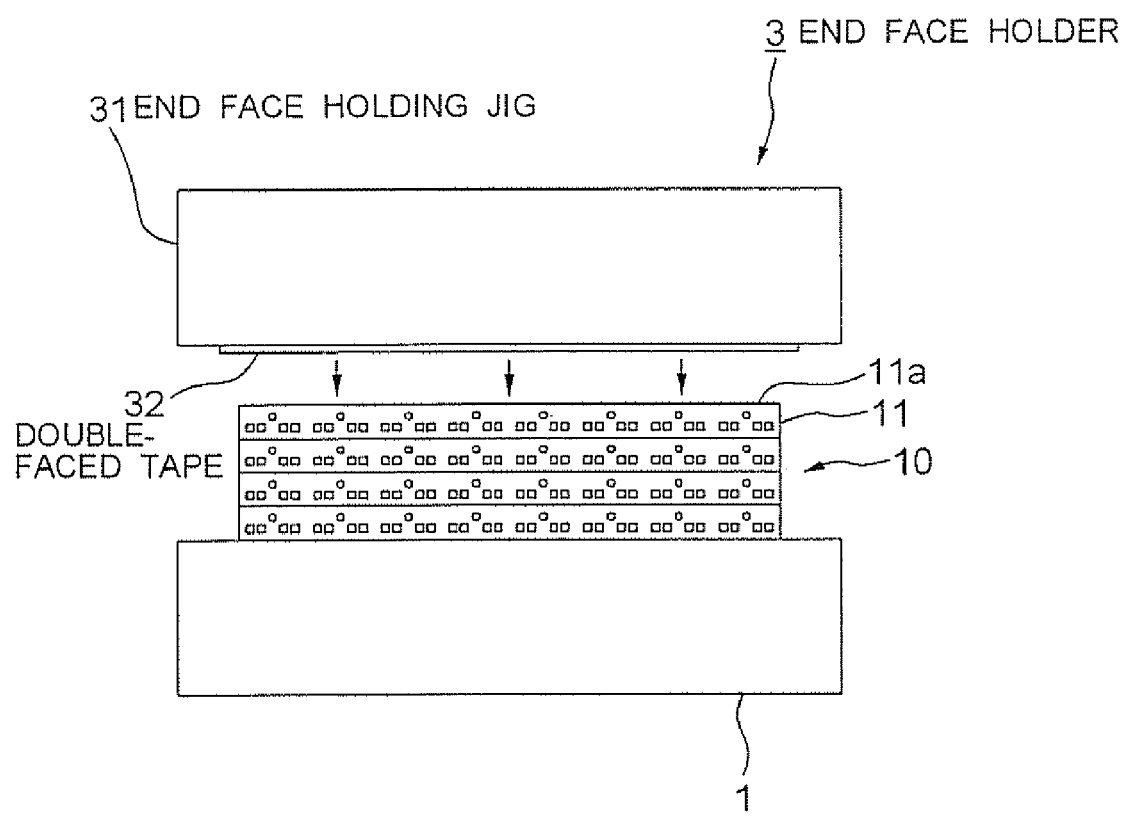

METHOD OF MANUFACTURING MAGNETIC HEAD SLIDER

BACKGROUND OF THE INVENTION

1. Field of the Invention

The present invention relates to a method of manufacturing magnetic head slider, and in particular, to a method of manufacturing magnetic head slider formed by cutting out from a block member and applied with surface processing.

2. Related Art

A magnetic head slider used for a hard disk drive is required to fly at a low amplitude above a magnetic disk with high accuracy. To achieve this, an ABS ((Air Bearing Surface) flying surface) in a predetermined shape must be formed on the surface facing the magnetic disk, and this surface must be processed by polishing (lapping) with high accuracy. At the same time, in polishing, the MR height (element length from the ABS) of the magnetic head element exposed on the ABS would be adjusted so as to perform data reading and writing to the magnetic disk. Since the MR height affects the accuracy of reading and writing performance to the magnetic disk, highly accurate adjustment is needed.

For these reasons, polishing of an ABS is an important step when processing a magnetic head slider. Further, the surface opposite to the ABS (back surface) is to be mounted on a suspension constituting a Head Gimbal Assembly (HGA), which affects the flying height above the magnetic disk. Therefore, highly accurate polishing is also required for the back surface.

Conventional method of manufacturing a magnetic head slider includes polishing of ABS and its back surface. First, a bar block, in which magnetic head sliders are aligned in a row, is cut out from a wafer where magnetic head elements of a plurality of magnetic head sliders are formed. Then, in a state where the back surface side with respect to the ABS is fixed to a predetermined jig, the ABS is polished. Next, the back surface is polished with the polished ABS side fixed to a predetermined jig. Then, pattern is formed through steps of etching the ABS, the bar block would then be cut into pieces of magnetic head sliders and the like, whereby a magnetic head slider is manufactured.

However, as hard disk drive has size reduction recently, the size of a magnetic head slider itself has been further miniaturized. Therefore, in the manufacturing process, handling such as fixing a member in a bar-block shape to a jig or the like is getting more difficult. In particular, direct handling of the minute and elongated fragile bar block would induce considerable damages to the magnetic head slider.

In view of the above, there are disclosed methods in which polishing of an ABS is performed before cutting into a bar block, and then cutting into a bar block shape, as shown in the following patent documents. Explanation will be given for these methods.

In a method disclosed in the publication of Japanese Patent Application Laid-open No. 11-316928 (Patent Document 1), first, a wafer block in which magnetic head sliders are aligned in a plurality of rows, that is, a wafer block consisting of plural rows of bar blocks, is cut out, and is mounted on a support plate. Next, ABS of magnetic head sliders positioned at the edge thereof is polished. Then, a tape is used so as to cover the polished ABS, and the bar block is cut out from the wafer block in such a state. Then, the bar block is held with vacuum tweezer and mounted on a jig for polishing the back surface, and the back surface is polished.

Similarly, in a method disclosed in the publication of Japanese Patent Document Laid-open No. 11-328642 (Patent Document 2), first, ABS is polished in a state of a wafer block, and then a bar block is cut out. Then, the bar block is adhered to a work holder with the ABS being the adhered surface, and the back surface is polished.

[Patent Document 1] JP11-316928A
[Patent Document 2] JP11-328642A

However, the conventional examples described above involve the following disadvantages. For instance, in either method, polishing of ABS is performed in a wafer block shape. In such method, although stable polishing of ABS can be realized, magnetic head sliders manufactured from an elongated fragile bar block may be damaged since the bar block is handled directly when the back surface is polished after cutting into a bar block.

More specifically, in Patent Document 1, polished ABS is covered with a taper but since it is mounted on a jig for processing the back surface by vacuum tweezer, it may be damaged or broken at that time. Further, a work to mount it on the jig is caused in the process. In Patent Document 2, on the other hand, polished ABS is adhered to a work holder so as to be protected, but it may be damaged when being adhered to the work holder, and also a work to mount it on the jig is caused in the process, similar to the above-described case. As mentioned above, in manufacturing electronic components required high product accuracy, problems of complication and delay of the manufacturing process are caused, in addition to the product quality's deteriorating. Moreover, an increase in the manufacturing cost is also a problem.

SUMMARY OF THE INVENTION

It is therefore an object of the present invention to provide a method of manufacturing a magnetic head slider, capable of solving the disadvantages of the above-described conventional examples, and in particular, improving the product quality, simplifying the manufacturing process and reducing the manufacturing time.

In order to achieve the object, a method of manufacturing a magnetic head slider, which is a mode of the present invention, is a method of manufacturing a magnetic head slider formed by cutting out from a block member, including the steps of: processing an end face of the block member forming one surface of the magnetic head slider (end face processing step); holding fixedly the end face of the block member processed (holding step); and while maintaining the holding state provided by the holding step, cutting a portion of the end face side of the block member (cutting step), and processing a cut surface of the cut portion forming another surface of the magnetic head slider (cut surface processing step).

According to the invention described above, an end face of the block member forming one surface of a magnetic head slider is processed first, and the processed end face is held. Then, while maintaining the holding state, a portion of the end face side including a magnetic head slider is cut out, and another surface of the magnetic head slider which is the cut surface of the cut out portion is processed. In this way, since cutting and processing of the cut surface are performed in the state of fixing the cut out portion, the process can be stabilized, and it is possible to prevent handling of a small-sized cut-out portion such as mounting on a processing device. Thereby, damage and breakage which may be caused on the magnetic head slider can be minimized. Accordingly, it is possible to simplify and speed-up the manufacturing process, to prevent damage on the magnetic head slider, and to manufacture a magnetic head slider of higher quality at lower cost.

Further, in the holding step, it is desirable to hold and cover the end face of the block member processed in the step of processing the end face. In the meantime, it is more desirable to hold via a protective member covering the end face of the block member. Thereby, since the end face, processed before being held, is held in the state of being protected, it is possible to effectively prevent damage on the magnetic head slider at the time of cutting and processing of the cut surface, which leads to an improvement in the product quality.

Further, in the holding step, the end face of the block member is held by a holding jig via an adhesive member adhering to the holding jig. In particular, in the holding step, the end face of the block member is held by being adhered to the holding jig with a double-faced tape. Thereby, the end face, processed before being held, is held in the state of being adhered to the holding jig with an adhesive member, so it is possible to stabilize cutting and processing of the cut surface, and to prevent damage on electronic components more effectively at the time of processing. Particularly, it is possible to simplify and speed-up the holding step by adhering them with a double-faced tape.

Note that the adhesive member is desirably a member having elasticity and conductivity. With such properties, it is possible to protect the end face against impact with the adhesive member and to prevent damage when holding the processed end face. Further, since the adhesive member has conductivity, it is possible to prevent electrostatic discharge damage of the magnetic head slider to be manufactured.

Further, the method further includes a step of releasing the holding state provided by the holding step (hold releasing step), after the cut surface processing state. The hold releasing step is, in particular, a step of separating adhered state of the end face of the block member and the holding jig with the adhesive member. For example, the adhesive member may be a member to be separated at a prescribed temperature, and in the hold releasing step, the holding state is released by heating the adhesive member up to the prescribed temperature. Alternatively, the adhesive member may be a member to be separated by being added with a prescribed solvent, and in the hold releasing step, the holding state is released by adding the prescribed solvent to the adhesive member. At this time, in the hold releasing step, a part held by the holding jig is dipped in the prescribed solvent. Further, it is more desirable to ultrasonic-vibrate the prescribed solvent in which the part held by the holding jig is dipped.

Since the holding state with the adhesive member and the like is released after cutting from the block member and processing of the cut surface have been performed, it is possible to obtain a portion which can be formed as a magnetic head slider to which high-quality processing has been performed as described above. Particularly, since the adhesive member is separated by heating or with solvent, it can be taken out quickly and easily and mechanical stress applied onto the magnetic head slider is minimized. These lead to a further improvement in the quality of the magnetic head slider.

Further, in the end face processing step, a surface facing a magnetic disk of the magnetic head slider is polished, and in the cutting step, a bar block in which a plurality of magnetic head sliders are arranged in a row is cut out from the block member, and in the cut surface processing step, a back surface with respect to the surface facing the magnetic disk of the magnetic head slider is polished. As described above, although process performed to the magnetic head slider includes polishing, such polishing is performed to the block member in the holding state provided by the holding step, so polishing can be performed stably. Accordingly, it is possible to effectively perform manufacturing of a magnetic head slider requiring high accuracy.

(Effects of the Invention)

The present invention is formed and worked as described above, whereby it is possible to stably process one end face of the magnetic head slider in the block member state, and then cutting and processing of the cut surface can be performed stably in the state of holding the one end face side. Accordingly, the present invention has such excellent effects as to stabilize, simplify and speed-up the manufacturing process, and to prevent damage on the magnetic head slider, whereby a high-quality magnetic head slider can be manufactured at low cost, which could not be achieved conventionally.

BRIEF DESCRIPTION OF THE DRAWINGS

FIGS. 1A and 1B are illustrations for explaining manufacturing objects, in which FIG. 1A shows a wafer and FIG. 1B shows a wafer block;

FIG. 2 is a configuration diagram of an apparatus for manufacturing a magnetic head slider, showing a configuration used for processing an end face;

FIG. 3 is a configuration diagram of the apparatus for manufacturing a magnetic head slider, showing a configuration used for holding the end face;

DESCRIPTION OF PREFERRED EMBODIMENTS

A method of manufacturing a magnetic head slider, which is the present invention, is characterized in that an end face of a block member, forming one surface of magnetic head slider, is processed, and in a state where the processed end face is held, the end face side is cut out, and another surface of the magnetic head slider, which is the cut surface of the cut-out portion, are processed. Hereinafter, specific examples thereof will be explained with reference to respective embodiments.

Note that the manufacturing methods described below are also applicable to manufacturing electronic devices other than magnetic head sliders. That is, they are also methods of manufacturing electronic components manufactured by cutting out from a block member and processing the cut surface.

Embodiment 1

Figure 1A:
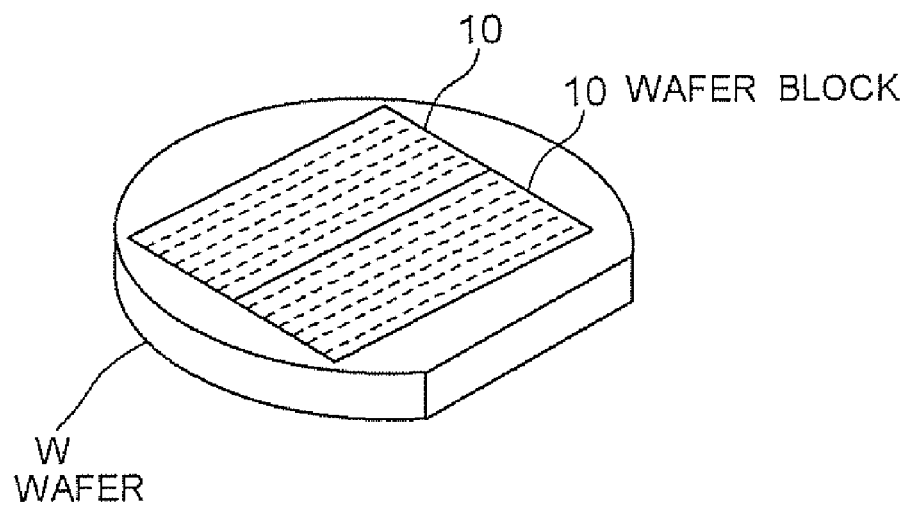
Figure 1B:
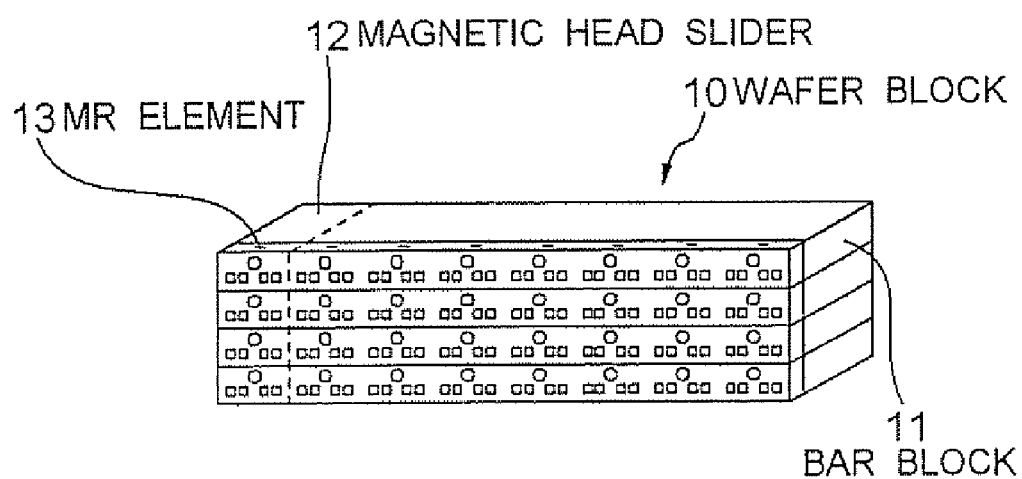
Figure 8:
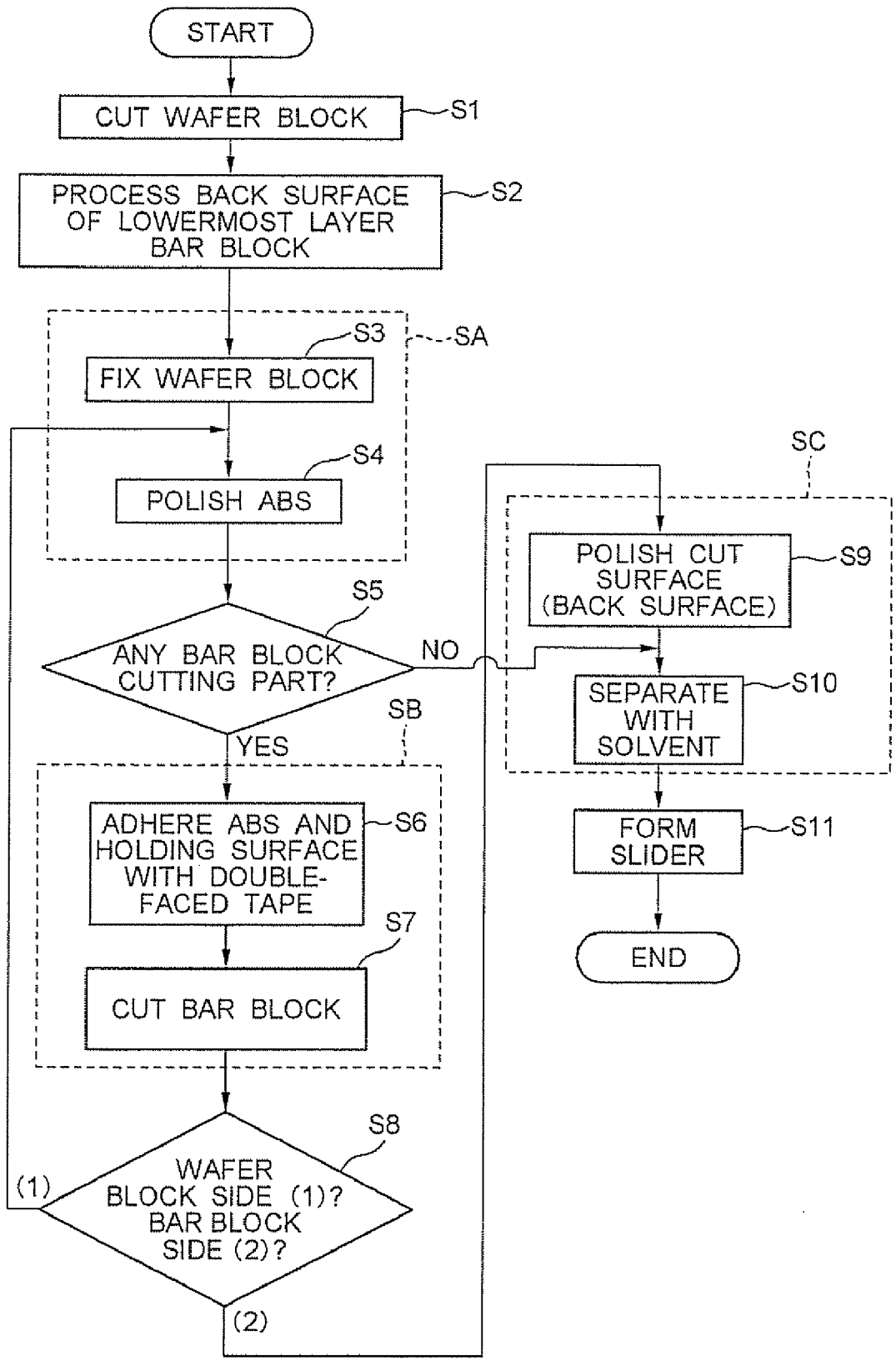
FIG. 8 is flowchart showing a method of manufacturing a magnetic head slider in the embodiment 1.
Figure 9:
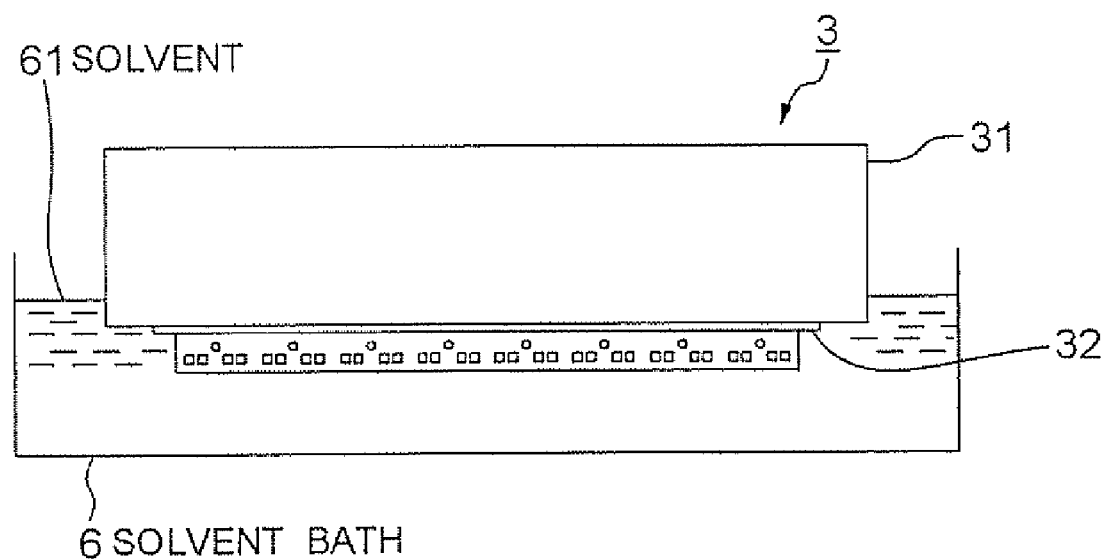
FIG. 9 is a configuration diagram of a variation of an apparatus for manufacturing a magnetic head slider in the embodiment 1, showing a configuration used for releasing a holding state.

A first embodiment of the present invention will be explained with reference to FIGS. 1A to 9. FIGS. 1A and 1B are illustrations showing processing objects processed to be magnetic head sliders. FIGS. 2 to 7 are diagrams showing an apparatus and a method for manufacturing a magnetic head slider. FIG. 8 is a flowchart showing a method of manufacturing a magnetic head slider. FIG. 9 is a diagram showing a variation or an apparatus and a method for manufacturing a magnetic head slider.

[Configuration]

An apparatus for manufacturing a magnetic head slider in the present invention is an apparatus for manufacturing pieces of magnetic head sliders in such a way that a wafer block 10 shown in FIG. 1B consisting of laminated bar blocks 11, in which a plurality of magnetic head sliders 12 are aligned in a row, is cut out from a wafer W shown in FIG. 1A, and the wafer block 10 is processed. The apparatus for manufacturing a magnetic head slider has, in particular, such a configuration that the bar blocks 11 are cut out and the cut surface 11b is processed, which is a characteristic of the present invention.

More specifically, the apparatus for manufacturing a magnetic head slider of the present embodiment includes: a wafer block holder 1 for holding the wafer block 10; an end face processor 2 (end face processing device) for processing the end face 11a of the wafer block 10; an end face holder 3 (holding device) for fixedly holding the processed end face of the wafer block 10; a cutter 4 (cutting device) for cutting a bar block from the wafer block 10; a cut surface processor 5 (cut surface processing device) for processing the cut surface; and a solvent bath 6 (hold releasing device) for releasing the holding state of the wafer block 10 held by the end face holder 3, as shown in FIGS. 2 to 7. Hereinafter, each configuration will be described in details.

<Wafer Block>

The magnetic head slider 12 is formed such that magnetic head element parts are formed by laminating a thin film on the wafer W and are cut into pieces. In order to do so, first, a wafer block 10 consisting of laminated bar blocks 11, in which a plurality of magnetic head sliders 12 are aligned laterally in a row, is cut out as described above. Then, the wafer block 10 is cut into bar blocks 11, and finally, cut into pieces of magnetic head sliders 12. FIG. 1A shows a state of the wafer W before the wafer block 10 is cut out, and FIG. 1B shows a state of the cut-out wafer block 10.

One end face 11a of the wafer block 10 serves as an ABS of a magnetic head slider 12 formed from the bar block 11 positioned at the edge part, that is, a flying surface facing a magnetic disk. Accordingly, on the ABS 11a, an MR element 13 for performing reading and writing of data to a magnetic disk is exposed in a magnetic head element part formed at an edge of the magnetic head slider 12. In order to adjust the MR height (element length from the ABS) of the MR element 13, polishing of the end face is performed as described below. Further, the bar blocks 11 are cut out one by one from the end part of the wafer block 10, as described later.

<Wafer Block Holder>

As shown in FIG. 2, in the wafer block 10, an end part (the other end part) opposite to the end part where the ABS 11a is formed is held by the wafer block holder 1. The wafer block holder 1 fixedly holds the other end part of the wafer block 10 with an adhesive (not shown) on the holding face. An adhesive used has a characteristic of adhering when heated, and further, has a characteristic that when a prescribed solvent is added, the adhesive strength is weaken so that it can be separated, same as a double-faced tape 32 described later. However, any method of holding the other end part of the wafer block 10 by the wafer block holder 1 is acceptable, so the wafer block holder 1 adopts a configuration corresponding to the holding method.

Note that the other end face of the wafer block 10 held by the wafer block holder 1 is polished by using a polishing device not shown before being held. That is, the other end face becomes the back surface, with respect to the ABS, of the magnetic head slider 12 cut out from the bar block 11 positioned at the lowermost layer, so it is polished while fixing the wafer block 10 to a predetermined jig, for example. Since the wafer block 10 is in a large shape when the back surface is processed, even though the wafer block 10 is fixed with a cramp-type jig, it is possible to prevent damage which may be caused thereto. However, any holding method is acceptable, so the wafer block 10 may be held such that a part other than that to be processed is adhered with a double-faced tape.

<End Face Processor>

The end face processor 2 is disposed on the opposite side to the part held by the wafer block holder 1. That is, as shown in FIG. 2, it is disposed on one end face side of the wafer block 10 so as to perform processing of the surface serving as the ABS 11a of the magnetic head slider 12. Particularly, the end face processor 2 of the present embodiment is a polishing device for polishing the ABS 11a.

The end face processor 2 is drive-controlled by a driving device or a controlling device not shown, and moves so as to contact the one end face 11a of the wafer block 10 as shown by the arrow in FIG. 2, and polish the ABS 11a which is the one end face. Here, polishing is performed to adjust the MR height of the MR element 13 exposed on the ABS 11a, and at the same time, polishing is performed to form a predetermined surface roughness so as to realize highly accurate flying above a magnetic disk.

<End Face Holder>

Next, the end face holder 3 will be explained with reference to FIG. 3. The end face holder 3 is a device for fixedly holding the ABS 11a which is the one end face of the wafer block 10 processed as described above. The end face holder 3 is disposed above the ABS 11a, instead of the end face processor 2, after the ABS 11a has been processed.

The end face holder 3 has an end face holding jig 31 for holding one end face of the wafer block 10, and a double-faced tape 32 adhered on the holding face of the end face holding jig 31. Although not shown, the end face holder 3 also includes a driving device and a controlling device for drive-controlling the end face holding jig 31. The end face holder 3 is driven such that the holding face on which the double-faced tape 32 is adhered contacts the one end face 11a, which has been polished, of the wafer block 10, as shown by the arrow in FIG. 3. Thereby, the holding face of the end face holding jig 31 and the one end face 11a (ABS) of the wafer block 10 are in a state of being adhered with the double-faced tape 32, whereby the bar block 11 of the one end face 11a side of the wafer block is in a state of being held fixedly by the end face holding jig 31.

The end face holder 3 maintains a state of holding the one end face 11a of the wafer block 10 by adhering to it with the double-faced tape 32 at the time of cutting the wafer block 10 and processing the cut surface which will be described later. Accordingly, after the cutting, the end face holder 3 is move-driven to a position where the cut surface can be processed while holding the bar block 11 cut out from the wafer block 10.

The double-faced tape 32 has an area covering at least the one end face 11a of the wafer block 10, that is, all over the ABS 11a processed by the end face processor 2 described above, and is attached so as to cover the ABS 11a. Thereby, the double-faced tape 32 covers all over the polished ABS 11a, so it serves as a protective member for preventing damage on the ABS 11a.

Further, the double-faced tape 32 is made of an elastic member having a predetermined elasticity. Thereby, the processed ABS 11a can be further protected appropriately. However, it is desirable that the elasticity and elastic range of the double-faced tape 32 be in a level not affecting processing of the surface opposite to the ABS 11a (back surface 11b) described later. Further, the double-faced tape 32 is a conductive member, and corresponding to it, the end face holding jig 31 is also a conductive member. Therefore, it is possible to suppress generation of electrostatic discharge damage of the wafer block 10 held, that is, of the magnetic head slider 12.

Further, the double-Laced tape 32 is a member which is separated when a prescribed solvent is added since the adhesive strength is weakened. This is for easily separating the bar block 11 from the end face holding jig 31 by using solvent after cutting the wafer block 10 and polishing the cut surface described later.

However, it is not necessary to use the double-faced tape 32 for holding the one end face 11a of the wafer block 10. Instead of the double-faced tape 32, the wafer block 10 may be adhered to the end face holding jig 31 by using another adhesive member such as an adhesive having the above-described characteristics. It is desirable that a substituting adhesive member have the characteristics held by the double-faced tape 32, but it is not limited to have the above-described characteristics.

<Cutter>

Figure 4:
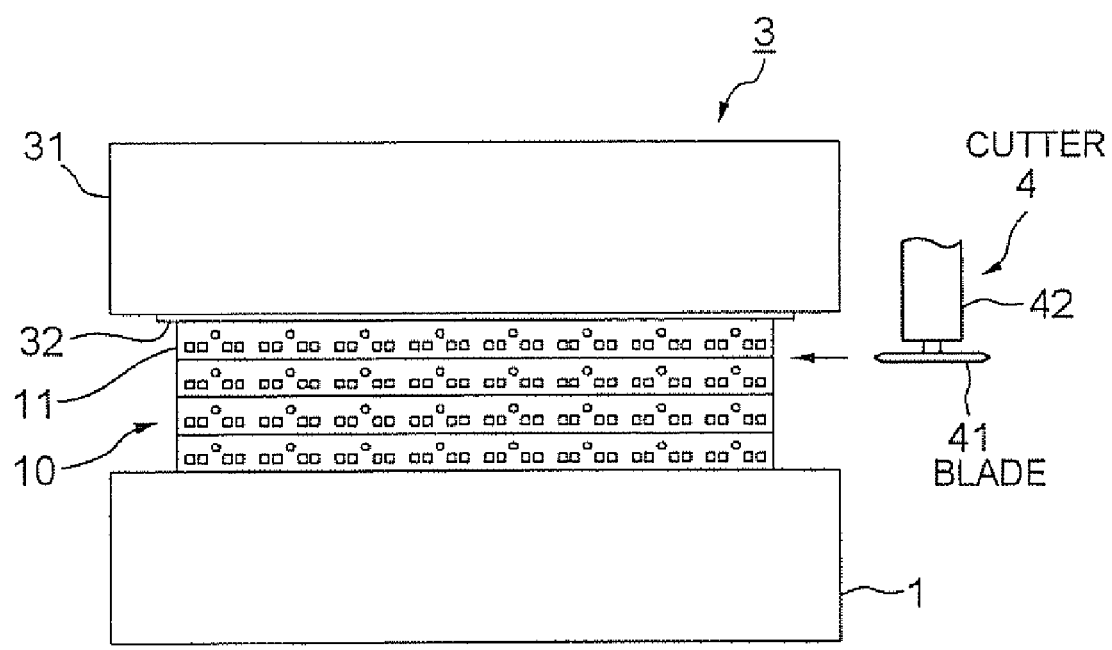
FIG. 4 is a configuration diagram of the apparatus for manufacturing a magnetic head slider, showing a configuration used for cutting.

Next, the cutter 4 will be explained with reference to FIG. 4. The cutter 4 includes a blade 41 for cutting and a driving device 42 for rotationally driving the blade, and operates so as to cut a bar block 11 positioned at one end face side of the wafer block 10. That is, the cutter 4 cuts the boundary between the bar block 11 held by the end face holder 3 and a bar block positioned at the lower layer thereof (see the arrow in FIG. 4). Since the one end face side of the wafer block 10 is held fixedly when cut by the cutter 4, cutting is performed stably.

Figure 5:
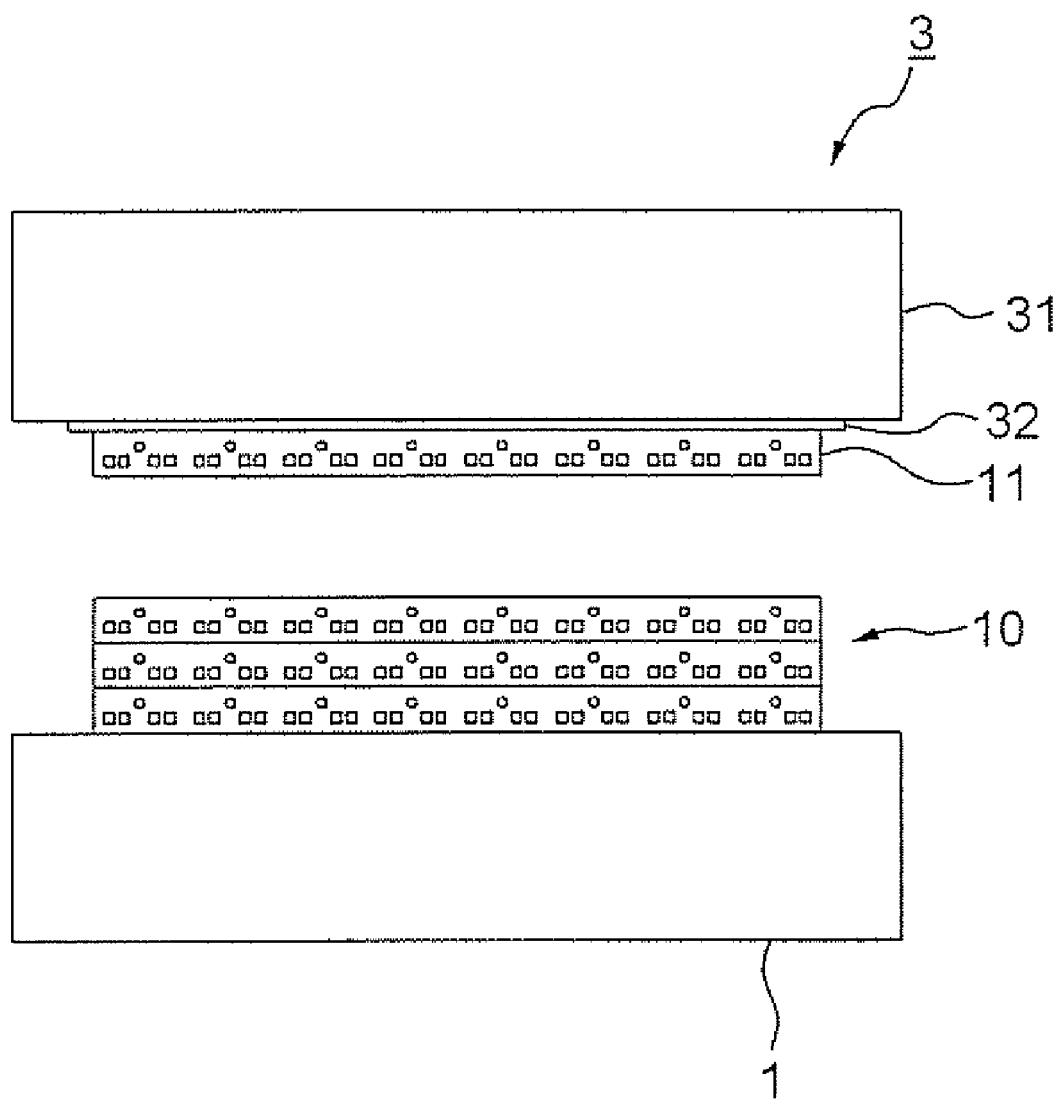
FIG. 5 is a configuration diagram of the apparatus for manufacturing a magnetic head slider, showing a state after a wafer block is cut out.

FIG. 5 shows a state where the bar block 11 is cut out from the wafer block 10 by the cutter 4. As shown in FIG. 5, the cut bar block 11 is held by the end face holder 3, and is an object of processing by the cut surface processor 5 which will be explained below. The remaining wafer block 10 is held by the wafer block holder 1, and is again to be an object of processing by the end face processor 2 and the like described above.

<Cut Surface Processor>

Figure 6:
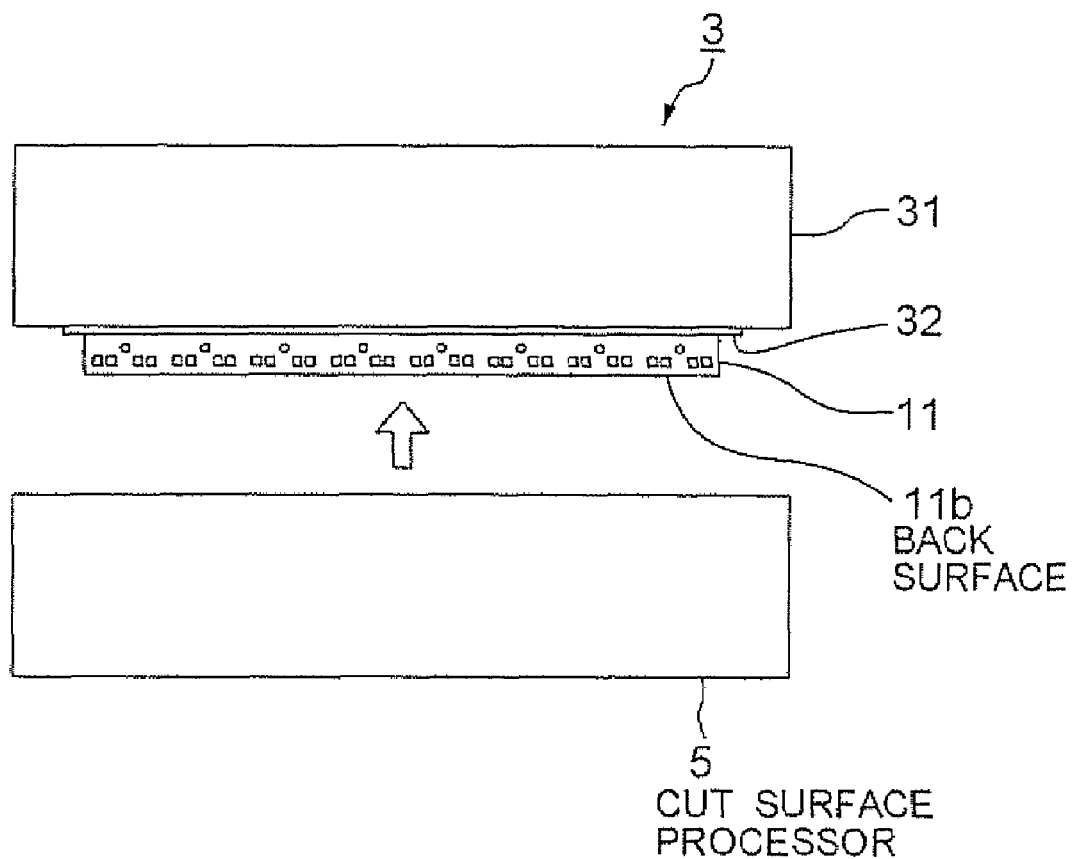
FIG. 6 is a configuration diagram of the apparatus for manufacturing a magnetic head slider, showing a configuration used for processing a cut surface.

Next, the cut surface processor 5 will be explained with reference to FIG. 6. The cut surface processor 5 is a device for processing the cut surface of the bar block 11 cut out from the wafer block 10, that is, a surface opposite to the ABS 11a (back surface 11b) of the bar block 11. Therefore, the cut surface processor 5 is disposed so as to be positioned on the back surface side of the bar block 11, that is, below the bar block 11 in the example shown in FIG. 6, after cutting. The cut surface processor 5 moves such that the processing face contacts the back surface 11b of the bar block 11 (see the arrow in FIG. 6), and performs processing. The cut surface processor 5 of the present embodiment is a polishing device for polishing the back surface 11. In polishing, the bar block 11 is in a state of being held by the end face holding jig 31, so polishing is performed stably.

<Solvent Bath>

Next, the solvent bath 6 (solvent adding device) will be explained with reference to FIG. 7. The solvent bath 6 is a container filled with prescribed solvent 61 for weakening the adhesive strength of the double-faced tape 32 described above. Near the opening thereof, there is a holder member 62 to which the end face holder 3 holding the bar block 11 is set. The holder member 62 has an opening on the upper face side, and a receiver 62a is formed in a dented shape with an inner bottom face. The receiver 62a in a dented shape is to be filled with the solvent 61 as described later.

Figure 7:
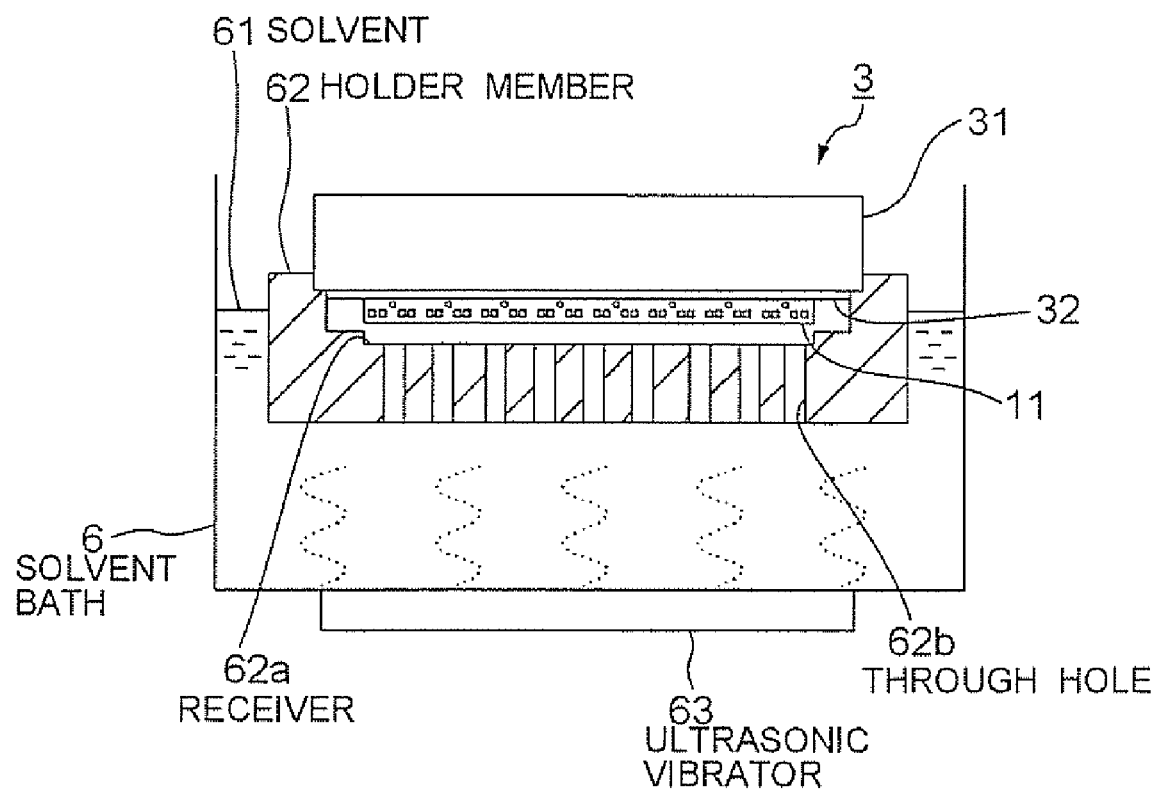
FIG. 7 is a configuration diagram of the apparatus for manufacturing a magnetic head slider in an embodiment 1, showing a configuration used for releasing a holding state.

As shown in FIG. 7, near the opening of the holder member 62, the end face holder 3 can be set as a whole while holding the bar block 11 in which the cut face has been polished, on the lower side thereof. Therefore, when the end face holder 3 is set, the bar block 11 and the double-faced tape 32 are dipped in the solvent 61 filled in the dented receiver 62a. Note that the inner bottom face of the receiver 62a serves to receive the bar block 11 separated from the end face holder 3 as described later.

In the bottom face of the holder member 62, that is, in the receiver 62a, a plurality of through holes 62b penetrating to the outside (in a lower direction) are present. This enables the solvent 61 in the solvent bath to flow into the receiver 62a of the holder member 62. Then, the dented receiver 62a is filled with the solvent 61 up to a level near to the opening of the holder member 62. Note that the opening of the holder member 62 is formed to have an area sufficient for dipping a part where the bar block 11 is adhered to the end face holder 3, that is, a part of the double-faced tape 32.

Further, the bottom face of the solvent bath 6 is provided with an ultrasonic vibrator 63 for applying ultrasonic vibration to the solvent 61. Accordingly, ultrasonic vibration generated from the ultrasonic vibrator 63 passes through the through holes 62b formed in the holder member 62 mediated by the solvent 61, and is transmitted to the solvent 61 filled in the dented receiver 62a.

Thereby, the solvent 61 is added to the double-faced tape 32 with which the bar block 11 is adhered to the end face holding jig 31. Further, since ultrasonic vibration is applied, the adhesive strength of the double-faced tape 32 is weakened efficiently in a short period. Consequently, the bar block 11 is separated from the end face holding jig 31. In other words, the solvent bath 6 and the solvent 61 serve as separating devices.

In this way, the bar block 11, in which the ABS 11a and the back surface 11b are polished, is separated from the end face holder 3 and is accommodated in the receiver 62a of the holder member 62. Accordingly, by collecting the holder member 62 as a whole, the bar block 11 can be collected easily.

Note that the solvent bath 6 shown in FIG. 7 is also used for separating the wafer block 10 held by being adhered with an adhesive, that is, the last bar block 11, from the wafer block holder 1 described above. At this time, it is only necessary to dispose the wafer block holder 1 on the holder member 62 with the last bar block 11 facing downward and to dip the holder member 62 in the solvent 61, same as the end face holder 3 shown in FIG. 7.

<Other Configurations>

The apparatus for manufacturing a magnetic head slider also includes configurations for forming pieces of magnetic head sliders 12 from the bar block 11. For example, the apparatus includes a device for forming patterns on the ABS 11a by dry etching, and a device for cutting the bar block 11 into pieces of magnetic head sliders 12. These configurations are devices typically used, so the detailed explanations thereof are omitted.

[Operation]

Next, a method of manufacturing a magnetic head slider using the manufacturing apparatus described above will be explained with reference to the flowchart in FIG. 8 and FIGS. 1A to 7 described above.

First, as shown in FIG. 1, the wafer block 10 in which the bar blocks 11 are laminated in a plurality of rows is cut out from the wafer W (step S1). Then, the other end part of the wafer block 10, that is, an end surface opposite to the end side where the ABS 11a is formed (back surface 11b) is polished (step S2). Then, as shown in FIG. 2, the polished end surface (back surface 11b) is held fixedly by the wafer block holder 1 by using an adhesive which will be separated by using the solvent 61 (step S3).

Next, in a state where the other end side of the wafer block 10 is held, the end face processor 2 is disposed on the surface of one end side, that is, the ABS 11a side, of the wafer block 10 to thereby polish the ABS 11a (step S4, end face processing step). Here, polishing is performed so as to make the MR height of the MR element 13 exposed on the ABS 11a to be an appropriate length and to realize an appropriate surface roughness. As described above, steps S3 and S4 are performed in a state where the wafer block 10 is held by the wafer block holder 1 (step SA).

When the polishing of the ABS 11e has been completed, it is checked whether two or more bar blocks are laminated in the wafer block 10, that is, whether there is a part to cut out the bar block 11 (step S5). If there is a cut part (positive determination in step S5), the end face holder 3 is disposed on the ABS 11a side, and the double-faced tape 32 adhered to the holding face of the end face holding jig 31 is adhered to the ABS 11a (step S6, holding step). At this time, it is preferable to align such that the double-faced tape 32 covers all over the polished ABS 11a. Thereby, one end face of the wafer block 10 and the holding face of the end face holding jig 31 are in a state of being adhered with the double-faced tape 32, so the one end face side of the wafer block 10 is held by the end face holder 3.

Then, cutting of the bar block 11 is performed. That is, as shown in FIG. 4, the cutter 4 is disposed at a position between the bar block 11 held by the end face holder 3 and a bar block positioned in the lower layer thereof. The bar block 11 held is cut out while maintaining the holding state of the one end face (ABS side) of the wafer block 10 by the end face holder 3 (step S7, cutting step). Note that steps S6 and S7 are carried out in a state where the wafer block 10 is held by both of the wafer block holder 1 and the end face holder 3 (step S8).

Then, to the bar block 11 side cut out from the wafer block 10 (proceed to (2) in step S8), polishing of the cut surface 11b of the bar block 11 is performed while holding the bar block 11 by the end face holder 3. That is, the cut surface processor 5 is disposed facing the back surface 11b opposite to the ABS 11a of the cut-out bar block 11, and polishing is performed to the back surface 11b (step S9, cut surface processing step). Thereby, the back surface 11b which is the surface mounted on the Head Gimbal Assembly can be polished with high accuracy to have a predetermined surface roughness.

Next, the holding part of the end face holder 3, to which the bar block 11 is adhered with the double-faced tape 32, is disposed on the holder member 62 of the solvent bath 6 and is dipped in the solvent 61, while being applied with ultrasonic vibration by the ultrasonic vibrator 63. As a result, the adhesive strength of the double-faced tape 32 is weakened by the solvent 61, whereby the bar block 11 is separated from the end face holder 3 (step S10, hold releasing step). Note that steps S9 and S10 described above are performed in a state where the bar block 11 is held by the end face holder 3 (step SC). By collecting the holder member 62 from the solvent bath 6, the separated bar block 11 is collected from the receiver 62a of the holder member 62. Thereby, the bar block 11, in which both of the ABS 11a and the back surface 11b are polished, is obtained.

In step S5 described above, if only one bar block 11 remains in the wafer block 10 after polishing the ABS in the wafer block 10 (negative determination in step S5), cutting is not needed any more, so an operation of removing the last bar block 11 from the wafer block holder 1 is performed. At this time, by setting the holding part of the wafer block holder 1 to the holder member 62 and dipping it in the solvent 61 same as step S10 described above, the solvent 61 is added to the adhesive (or a double-faced tape, etc.) used for holding in the same manner as described above, whereby the last bar block 11 is separated. Since the back surface 11b of the bar block 11 has been polished first (step S2), the bar block 11 in which the both surfaces are polished is obtained.

Further, in step S8, to the wafer block 10 after the bar block 11 is cut out (proceed to (1) in step S8), polishing is again performed to the ABS 11a serving as the end face in the state of being held by the wafer block holder 1, and cutting, cut surface polishing and steps S4 to S7 described above are repeated.

Then, to the bar block 11 in which the both surfaces are polished, processing for forming magnetic head sliders 12, such as forming ABS using dry etching and cutting into pieces of sliders, is performed (step S11).

Through these steps, the bar block 11 is cut out and the cut surface is polished in a state where one end face of the wafer block is held Therefore, it is possible to prevent handling of fragile bar block 11, which has been cut out, for mounting on a jig for performing back surface polishing, for example, Accordingly, it is possible to prevent damage and breakage on the magnetic head sliders 12 in the bar block 11 to thereby manufacture high quality products. Further, it is possible to stabilize, simplify and speed-up the manufacturing process, which also leads to low manufacturing cost.

Further, since the polished ABS 11a is adhered to the end face holder 3 with the double-faced tape 32, the polished ABS 11a can also be protected appropriately at the time of another processing. At the same time, since it is held with the double-sided tape 32 adhered thereto, it is possible to simplify and speed-up the holding step, and cutting step and polishing step related thereto.

Further, since the adhesive strength of the double-faced tape 32 is weakened so as to separate the bar block 11 from the end face holder 3, it is possible to minimize unnecessary stress applied to the bar block 11, to prevent damage on the magnetic head slider 12, and to improve quality of the product. Further, by ultrasonic-vibrating the solvent 61, it is possible to improve the separation efficiency, so the separating process can be performed faster and a separated state suppressing an influence on the product can be obtained.

As described above, the manufacturing method and the manufacturing apparatus described above are preferable in manufacturing high-quality electronic components. Therefore, by applying those methods in manufacturing magnetic head sliders requiring high accuracy, it is possible to obtain more advantages described above.

[Variation]

Another exemplary configuration of the solvent bath 6, which is a solvent adding device for performing solvent separation from the end face holder 3 in step S10 of FIG. 8 as described above, will be explained with reference to FIG. 9.

The solvent bath 6 shown in FIG. 9 is a container filled with the prescribed solvent 61 which weakens the adhesive strength of the double-faced tape 32 described above, having an opening with sufficient area for dipping the part where the bar block 11 is adhered to the end face holder 3, that is, the part of the double-faced tape 32. From this opening, the bar block 11, in which the cut surface has been polished, is dipped with the whole end face holder 3 as described above. Thereby, the solvent 61 is added to the double-faced tape 32, so that the adhesive strength of the double-faced tape 32 is weakened, whereby the bar block 11 is separated from the end face holding jig 31. Consequently, the bar block 11, in which the ABS 11a and the back surface 11 have been polished, is dropped in the solvent bath 6. Accordingly, by disposing a tray for collecting the bar block 11 in the solvent bath 6 and collecting the tray, the bar block 11 is collected easily.

As described above, it is not necessary to provide the above-described holder member 62 and ultrasonic vibrator 63 shown in FIG. 7 in the solvent bath 6. Further, the configurations of the solvent adding device for separating the bar block 11 from the end face holding jig 31 are not limited to the above-described configuration. For example, the solvent 61 may be added to the double-faced tape 32 by spraying the solvent 61 to the adhered part between the bar block 11 and the end face holding jig 31, or yet another configuration may be adopted.

Embodiment 2

Figure 10:
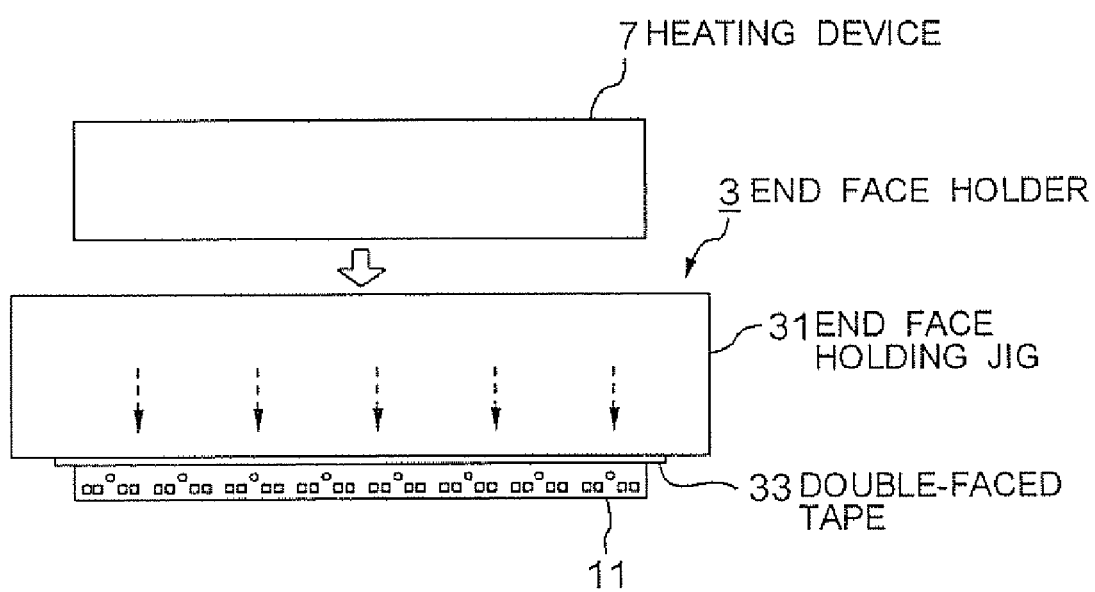
FIG. 10 is a configuration diagram of an apparatus for manufacturing a magnetic head slider of an embodiment 2, showing a configuration used for releasing a holding state.
Figure 11:
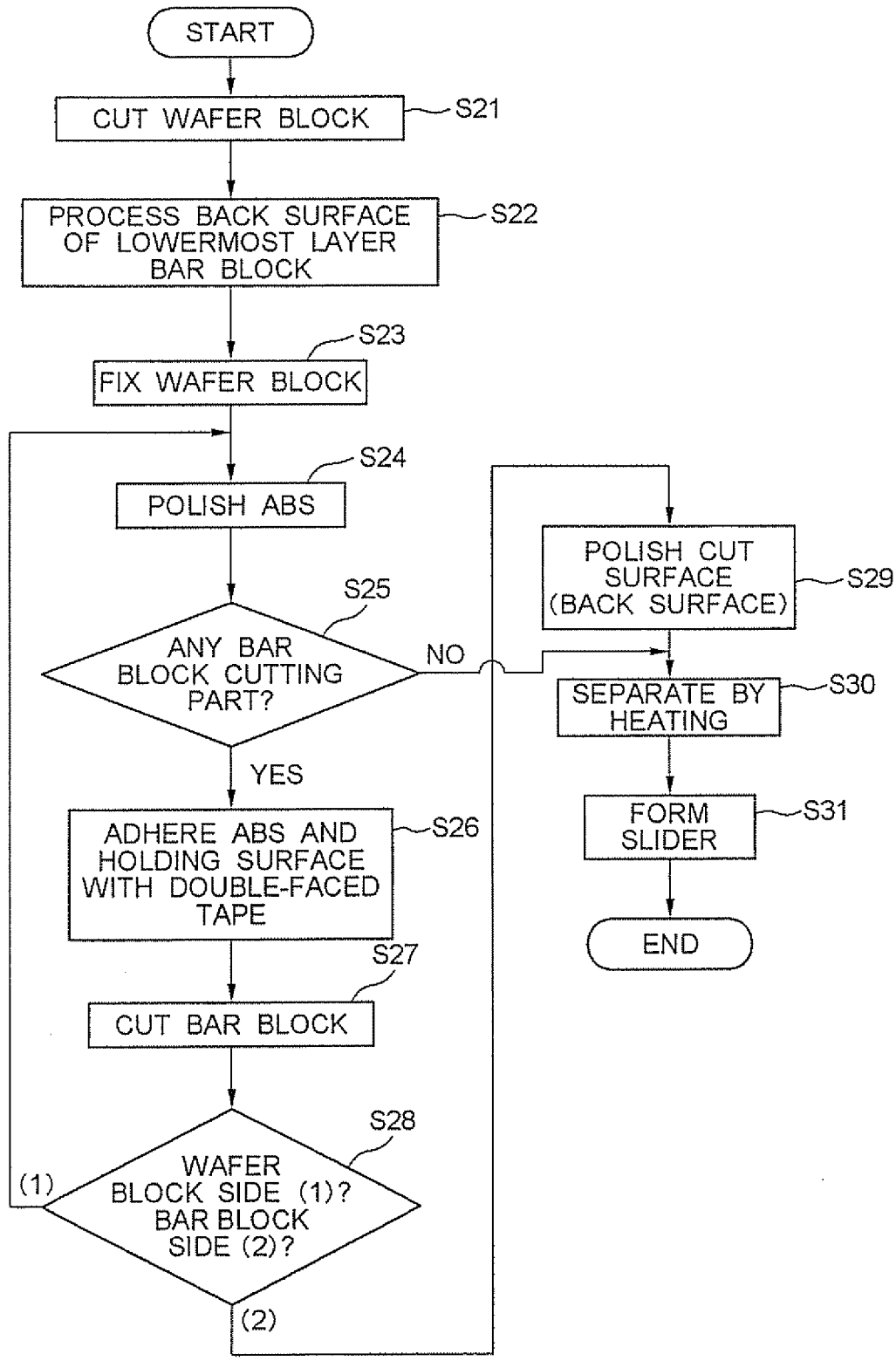
FIG. 11 is a flowchart showing a method of manufacturing a magnetic head slider of the embodiment 2

Next, a second embodiment of the present invention will be explained with reference to FIGS. 10 to 11. FIG. 10 is a diagram showing a part of an apparatus for manufacturing a magnetic head slider of the present embodiment. FIG. 11 is a flowchart showing a manufacturing method.

A method of manufacturing a magnetic head slider in the present embodiment is almost same as the method described in the embodiment 1, but is different in that a step of separating the bar block, in which the back surface has been processed, from the end face holder 3 is not a method using the solvent 61. Accordingly, the apparatus is also different. Hereinafter, the configuration will be explained with reference to FIG. 10, and the operation will be explained with reference to FIG. 11.

[Configuration]

The end face holder 3 of the present embodiment includes a double-faced tape 33 for adhering and holding one end face of the wafer block 10, that is, the bar block 11 to be cut out, same as that described above. The double-faced tape 33 is a member particularly having such a characteristic that the adhesive strength is weakened when heated to a prescribed temperature so it is separated. The prescribed temperature is, for example, a level not lower than a room temperature (e.g., 25° C.) but not thermally destructing the magnetic head slider 12 (e.g., 90° C. Even in the case of using another adhesive material such as an adhesive instead of the double-faced tape 33, a material having such a characteristic can be used.

Further, the hold releasing device for releasing the holding state of the bar block 11, which is a part of the manufacturing apparatus of the present embodiment, is a heater 7 as shown in FIG. 10. The heater 7 is, for example, a device for applying heat by contacting the end face holding jig 31 from the side opposite to the holding face of the bar block 11 as shown by the arrow in FIG. 10. Thereby, the applied heat is transmitted to the double-faced tape 33 adhered to the holding face as shown by the arrows of dotted lines in FIG. 10. When the temperature of the double-faced tape 33 reaches a predetermined temperature, the adhesive strength is weakened and the bar block 11 is separated from the end face holding jig 31.

However, the configuration of the heater 7 is not limited to the configuration described above, and may be one heating the double-faced tape 33 by any means. For example, a configuration of blowing hot air to the holding face or a configuration of heating in a heating room is also acceptable.

[Operation]

Next, a method of manufacturing a magnetic head slider of the present embodiment will be explained with reference to the flowchart of FIG. 11 and FIG. 10 described above. Since most steps are same as those of the embodiment 1, explanation will be given briefly.

First, the wafer block 10, in which the bar blocks 11 are laminated in a plurality of rows, is cut out from the wafer W (step S21). Then, the other end of the wafer block 10, that is, the back surface 11b which is the end face opposite to the end side where the ABS 11a is formed, is polished (step S22), and the polished back surface 11b side is held fixedly by the wafer block holder 1 by using an adhesive (step S23). Note that an adhesive used here has a characteristic of being separated when heated, same as the double-faced tape 33 described above.

Next, in a state where the other end side of the wafer block 10 is held, the surface of the one end side of the wafer block 10, that is, the ABS 11a, is polished (step S24, end face processing step). Then, if there is a part to cut out the bar block 11 (positive determination in step S25), the double-faced tape 33 adhered to the holding face of the end face holding jig 31 is adhered to the ABS 11a. Thereby, the one end face of the wafer block 10 and the holding face of the end face holding jig 31 are in a state of being adhered with the double-faced tape 32, whereby the one end face side of the wafer block 10 is held by the end face holder 3 (step S26, holding step). Note that the double-faced tape 33 has a characteristic of being separated when heated as described above.

Next, the bar block 11 is cut out while holding the one end face of the wafer block 10 (step S27, cutting step). Then, on the end face holder 3 side, the cut surface 11b of the bar block 11 is polished while maintaining the state of holding the cut-out bar block 11 (proceed to (2) in step S28, step S29, cut surface processing step). On the other hand, on the wafer block holder 1 side, steps S24 to S27 are repeatedly performed to the remaining wafer block 10.

Next, by contacting the heater 7 to the end face holding jig 31 in the state where the bar block 11 is adhered with the double-faced tape 33, the double-faced tape 33 is heated via the end face holding jig 31. Then, when the double-faced tape 33 is heated up to the prescribed temperature, the adhesive strength of the double-faced tape 33 is weakened, whereby the bar block 11 is separated from the end face holding jig 31 (step S30, hold releasing step). Then, by collecting the separated bar block 11, the bar block 11 in which both of the ABS 11a and the back surface 11b are polished is obtained.

In step S25, if there is no cutting part, that is, if the wafer block 10 held by the wafer block holder 1 consists of one bar block 11 (negative determination in step S25), heating is performed so as to separate the bar block 11 from the wafer block holder 1 (step S30). Since the separated back surface 11b has been polished (see step S22), the bar block in which the both surfaces are polished is obtained.

After these steps, processing for forming magnetic head sliders 12 such as forming patterns on the ABS and cutting into pieces of sliders is performed to the bar block 11 with both surfaces polished (step S31).

Through these steps, there is no need to remove the bar block 11 from the end face holding jig 31 by applying unnecessary stress to the bar block 11, it is therefore possible to minimize applying of unnecessary mechanical stress, and to prevent damage on the magnetic head slider. Therefore, it is possible to manufacture a high-quality magnetic head slider.

INDUSTRIAL APPLICABILITY

The present invention can be used for manufacturing a magnetic head slider to be mounted on a hard disk drive, and has industrial applicability.

What is claimed is:

1. A method of manufacturing a magnetic head slider formed by cutting out from a block member, comprising:
    processing an end face of the block member to form one surface of the magnetic head slider;
    holding fixedly with an end face holder, the processed end face of the block member;
    while maintaining a state of holding fixedly of the processed end face of the block member with the end face holder, cutting a portion of an end face side opposite to the processed end face of the block member; and
    while continuing the maintaining of the state of holding fixedly of the processed end face of the block member with the end face holder, processing a cut surface of the cut portion of the end face side opposite to the processed end face of the block member to form another surface of the magnetic head slider;
    wherein the cutting of the portion of the end face side and the processing of the cut surface are performed while the entire surface of the processed end face of the block member is covered by the end face holder.

2. The method of manufacturing the magnetic head slider as claimed in claim 1, wherein in the holding, the processed end face of the block member is held by a holding jig via an adhesive member adhering to the holding jig.

3. The method of manufacturing the magnetic head slider as claimed in claim 2, wherein in the holding, the processed end face of the block member is held by being adhered to the holding jig with a double-faced tape.

4. The method of manufacturing the magnetic head slider as claimed in claim 2, further comprising releasing the holding state provided by the holding, after the processing of the cut surface.

5. The method of manufacturing the magnetic head slider as claimed in claim 4, wherein
    the adhesive member is a member to be separated at a prescribed temperature, and
    in the step of releasing, the holding state is released by heating the adhesive up to the prescribed temperature.

6. The method of manufacturing the magnetic head slider as claimed in claim 4, wherein
    the adhesive member is a member to be separated by being added with a prescribed solvent, and
    in the releasing, the holding state is released by adding the prescribed solvent to the adhesive member.

7. The method of manufacturing the magnetic head slider as claimed in claim 6, wherein
    in the releasing, a part held by the holding jig is dipped in the prescribed solvent.

8. The method of manufacturing the magnetic head slider as claimed in claim 7, wherein
    in the releasing, the prescribed solvent is ultrasonic-vibrated.

9. The method of manufacturing the magnetic head slider as claimed in claim 1, wherein
    in the processing of the end face, a surface facing a magnetic head slider is polished, and in the cutting, a bar block in which a plurality of magnetic head sliders are arranged in a row is cut out from the block member, and
    in the processing of the cut surface, a back surface with respect to the surface facing the magnetic disk of the magnetic head slider is polished.

* * * * *